US006791520B2

(12) United States Patent
Choi

(10) Patent No.: US 6,791,520 B2
(45) Date of Patent: Sep. 14, 2004

(54) IMAGE STICKING MEASUREMENT METHOD FOR LIQUID CRYSTAL DISPLAY DEVICE

(75) Inventor: Hyoung Rack Choi, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 379 days.

(21) Appl. No.: 09/978,055

(22) Filed: Oct. 17, 2001

(65) Prior Publication Data

US 2002/0067325 A1 Jun. 6, 2002

(30) Foreign Application Priority Data

Oct. 19, 2000 (KR) ........................................ 2000-61679

(51) Int. Cl.$^{7}$ ................................................ H04N 17/02

(52) U.S. Cl. ............................ 345/89; 345/48; 345/63; 345/77; 345/84; 345/87; 345/102; 345/204; 345/205; 345/206; 345/589

(58) Field of Search ............................. 345/48, 63, 77, 345/84, 89, 87, 102, 204, 205, 206, 589, 690; 362/31

(56) References Cited

U.S. PATENT DOCUMENTS

| | | | | | |
|---|---|---|---|---|---|
| 5,561,459 | A | * | 10/1996 | Stokes et al. | 348/180 |
| 5,709,447 | A | * | 1/1998 | Murakami et al. | 362/31 |
| 5,740,312 | A | * | 4/1998 | Tanaka et al. | 386/129 |
| 5,767,935 | A | * | 6/1998 | Ueda et al. | 349/112 |
| 6,100,030 | A | * | 8/2000 | McCasky Feazel et al. | 435/6 |
| 6,465,970 | B2 | * | 10/2002 | Nagakubo et al. | 315/169.4 |
| 6,483,906 | B1 | * | 11/2002 | Iggulden et al. | 379/102.03 |
| 2002/0024456 | A1 | * | 2/2002 | Fields | 341/137 |
| 2003/0049459 | A1 | * | 3/2003 | Ishii et al. | 428/423.1 |

* cited by examiner

*Primary Examiner*—Bipin Shalwala
*Assistant Examiner*—Vincent E. Kovalick
(74) *Attorney, Agent, or Firm*—Morgan Lewis & Bockius LLP

(57) ABSTRACT

A method for measuring an image-sticking defect in a liquid crystal display device includes steps of irradiating light from a backlight to the liquid crystal display device, displaying a first full white state on a liquid crystal display screen of the liquid crystal display device to which the light is irradiated, measuring first luminance values of a plurality of designated points on the liquid crystal display screen, calculating an average luminance value of the first full white state using the first luminance values, displaying a full black state on the liquid crystal display screen, measuring second luminance values of the plurality of designated points on the liquid crystal display screen, calculating an average luminance value of the full black state using the second luminance values, forming a gray scale using the average luminance value of the first full white states and the average luminance value of the full black state, displaying a second full white state on the liquid crystal display screen, and measuring a luminance change of the second full white state with time at the plurality of designated points using the gray scale.

18 Claims, 9 Drawing Sheets

IMAGE STICKING MEASUREMENT METHOD FOR LIQUID CRYSTAL DISPLAY DEVICE

This application claims the benefit of Korean Patent Application No. 2000-61679, filed on Oct. 19, 2000 in Korea, which is hereby incorporated by reference.

BACKGROUND OF THE INVENTION

1. Field of the Invention

The present invention relates to a liquid crystal display device, and more particularly, to a method for measuring an image-sticking or residual image and for ascertaining whether the image-sticking or residual image exists.

2. Description of the Related Art

Until now, the cathode-ray tube (CRT) has been generally used for display systems. However, flat panel displays are increasingly beginning to be used because of their small depth dimensions, desirably low weight, and low power consumption requirements. Presently, thin film transistor-liquid crystal displays (TFT-LCDs) are being developed with high resolution and small depth dimensions.

Generally, liquid crystal display (LCD) devices make use of optical anisotropy and polarization properties of liquid crystal molecules to control alignment direction. The alignment direction of the liquid crystal molecules can be controlled by application of an electric field. Accordingly, when the electric field is applied to the liquid crystal molecules, the alignment of the liquid crystal molecules changes. Since refraction of incident light is determined by the alignment of the liquid crystal molecules, display of image data can be controlled by changing the applied electric field.

Of the different types of known LCDs, active matrix LCDs (AM-LCDs), which have thin film transistors and pixel electrodes arranged in a matrix form, are of particular interest because of their high resolution and superiority in displaying moving images. Because of their light weight, thin profile, and low power consumption characteristics, LCD devices have wide application in office automation (OA) equipment and video units. A typical LCD panel may include an upper substrate, a lower substrate and a liquid crystal layer interposed therebetween. The upper substrate, commonly referred to as a color filter substrate, may include a common electrode and color filters. The lower substrate, commonly referred to as an array substrate, may include switching elements, such as thin film transistors (TFTs), and pixel electrodes.

FIG. 1 is a cross-sectional view of a pixel of a conventional LCD panel in an active matrix LCD. As shown, the LCD panel 20 includes upper and lower substrates 5 and 15 and a liquid crystal (LC) layer 10 interposed therebetween. The lower substrate 15 includes a thin film transistor (TFT) "K" as a switching element that transmits a voltage to the pixel electrode 14 to change the orientation of the LC molecules. The pixel electrode 14 disposed on a transparent substrate 1 applies an electric field across the LC layer 10 in response to signals applied to the TFT "K." A first alignment layer 6 may be disposed over the TFT "K" and pixel electrode 14 adjacent to the LC layer 10. Moreover, the lower substrate 15 includes a storage capacitor 16 that maintains the voltage on the pixel electrode 14 for a period of time.

The upper substrate 5 may include a color filter 2 for producing a specific color and a common electrode 4 over the color filter 2. The common electrode 4 serves as an electrode for producing the electric field across the LC layer (in combination with the pixel electrode 14). The common electrode 4 may be arranged over a pixel region "P," i.e., a display area. The second alignment layer 7 may be disposed on the common electrode 4. Further, to prevent a leakage of the LC layer 10, a pair of substrates 5 and 15 may be sealed by a sealant 12.

Although FIG. 1 only shows one TFT "K," the lower substrate 15 usually includes a plurality of TFTs as well as a plurality of pixel electrodes each of which electrically contact each of the plurality of TFTs. In the above-described LCD panel 20, the lower substrate 15 and the upper substrate 5 are respectively formed through different manufacturing processes, and then attached to each other. Moreover the LCD device may include a backlight 19 including a light source 18 and a number of panels 17 for irradiating the light emitted from the light source 18 uniformly across the LCD panel. As previously described, the liquid crystal display devices make use of the optical anisotropy and polarization properties of the liquid crystal molecules. Since the liquid crystal molecules are thin and long, and the electric field is applied to the liquid crystal layer, the alignment direction of the liquid crystal molecules can be changed and controlled by the applied electric field. Accordingly, incident light is modulated to display images.

FIG. 2 is a circuit diagram of a conventional active matrix liquid crystal display panel.

In FIG. 2, the active matrix liquid crystal display panel comprises a number of horizontal gate bus lines 32, and a number of perpendicular data bus lines 42 intersecting the gate bus lines 32, thereby forming a matrix of orthogonal bus lines 32 and 42. One pixel is formed at each intersection of the gate and data bus lines 32 and 42. Moreover, a thin film transistor "K" is formed at each intersection of the gate and data bus lines 32 and 42 that includes a source electrode "S" connected to a corresponding data bus line 42, a gate electrode "G" connected to a corresponding gate bus line 32 and a drain electrode "D" connected to a storage capacitor "$C_{st}$" and a corresponding individual or pixel electrode of liquid crystal cell "$C_{lc}$." A pixel voltage "$V_p$" is applied to the pixel electrode of the liquid crystal cell "$C_{lc}$" from the data bus lines 42 through the TFT "K." A common voltage "$V_{com}$" is applied to a common electrode that is connected to both the liquid crystal cell "$C_{lc}$" and the storage capacitor "$C_{st}$." In the conventional liquid crystal display panel, the liquid crystal cell "$C_{lc}$" and the storage capacitor "$C_{st}$" are connected in parallel. A scanning line driving circuit 30 successively supplies a gate pulse voltage to the gate bus lines 32 with a horizontal scanning period. On the other hand, a signal line driving circuit 40 supplies a pixel signal voltage to the data bus lines 42 in each horizontal scanning period.

The array substrate of the active matrix liquid crystal display panel integrally comprises (m×n)-number of pixel electrodes 14 (of FIG. 1) arranged in a matrix, an m-number of gate bus lines $G_1$ to $G_m$ arranged along the rows of the pixel electrodes, an n-number of data bus lines $D_1$ to $D_n$ arranged along the columns of the pixel electrodes. Furthermore, an (m×n)-number of thin film transistors "K" are arranged as switching elements in the vicinity of cross points between the gate bus lines $G_1$ to $G_m$ and the data bus lines $D_1$ to $D_n$ corresponding to the (m×n)-number of the pixel electrodes. The scanning line driving circuit 30 drives the gate bus lines $G_1$ to $G_m$, and a signal line driving circuit 40 drives the data bus lines $D_1$ to $D_n$.

Therefore, the scanning line driving circuit 30 successively supplies the gate bus lines 32 with a signal that drives all the gate bus lines $G_1$, $G_2$, . . . $G_m$ to turn on all the TFTs "K" arranged in the direction of the column selected by the gate bus lines. The signal line driving circuit 40 also supplies to the data bus lines 42 a signal that drives all the data bus lines $D_1$, $D_2$, . . . $D_n$ to apply a predetermined potential through the data bus lines to all the TFTs "K" that have been turned on. When the gate pulse voltage is applied to the gate bus line $G_1$, all the TFTs "K" connected to the gate bus line $G_1$ are turned on. At this time, the turned-on TFTs "K" electrically connect the data bus lines to the liquid crystal cell "$C_{lc}$" and storage capacitor "$C_{st}$" that are electrically connected to the gate bus line $G_1$. As a result, the pixel voltage supplied from the signal line driving circuit 40 is applied to the determined liquid crystal cell "$C_{lc}$" and storage capacitor "$C_{st}$." Specifically, the liquid crystal molecules are aligned and oriented by the pixel signal voltage applied to the liquid crystal cell "$C_{lc}$," thereby displaying images using the anisotropic characteristics of the liquid crystal molecules.

Thereafter, the gate pulse voltage is applied to the gate bus line $G_2$, thereby turning on the TFTs connected to the gate bus line $G_2$. At this time, the TFTs connected to the gate bus line $G_1$ are turned off. However, the accumulated electricity in the liquid crystal cell "$C_{lc}$" and storage capacitor "$C_{st}$" electrically connected to the gate bus line $G_1$ makes the TFTs connected to this gate bus line $G_1$ continue in on-state until the gate pulse voltage is applied to the gate bus line $G_1$ at the next time.

Some problems occur when operating a thin film liquid crystal display using the above-described method. For example, an image-sticking defect may occur when a residual image is displayed as a result of continuously displaying the same image for a long period of time. The image-sticking defect is commonly caused by a residual direct current (R-DC) voltage generated in the liquid crystal cell "$C_{lc}$" as explained in FIGS. 3, 4A and 4B. Furthermore, another cause of the image-sticking defect is a reciprocal action of pairs of alignment layers due to electrical stress weakness of the alignment layer.

FIG. 3 is a partial circuit diagram of a conventional pixel of liquid crystal display panel, FIG. 4A is a voltage plot showing the voltages applied to the thin film transistor of the liquid crystal panel, and FIG. 4B is a voltage plot showing the voltage applied to the liquid crystal cell via the thin film transistor. Alignment of liquid crystal molecules deteriorates as a result of application of a direct current voltage. Furthermore, dielectric anisotropy affects the dielectric constant of the liquid crystal cell in accordance with the alignment of the liquid crystal molecules. Accordingly, an alternating current voltage is widely used when driving the thin film transistor.

In FIG. 4A, when employing the above-described method for operating a TFT-LCD operation method, a signal voltage Vd applied to the source electrode "S" begins to accumulate in the liquid crystal cell and storage capacitor at the time when the gate pulse voltage Vg is applied to the thin film transistor. Although this accumulated signal voltage Vd should be maintained until a next signal voltage is applied, the accumulated signal voltage Vd is discharged by the parasitic capacitor "$C_{gs}$" that is formed between the gate electrode "G" and the source electrode "S" of the thin film transistor (shown in FIG. 3). The discharge voltage ΔV, shown in FIG. 4B, causes an "off-set" direct current voltage to be applied to the liquid crystal cell "$C_{lc}$." Accordingly, the storage capacitor "$C_{st}$" is parallel-connected to the liquid crystal cell "$C_{lc}$" to suppress the "off-set" direct current voltage. However, the storage capacitor "$C_{st}$" cannot completely control the "off-set" direct current voltage, and a portion of the "off-set" direct current voltage is applied to the liquid crystal cell "$C_{lc}$."

In FIG. 3, when the direct current voltage is applied to the liquid crystal cell "$C_{lc}$," impurities 52 and 53 are ionized. Positively ionized impurities 52 are adjacent to a negatively polarized alignment layer 51 and negatively ionized impurities 53 are adjacent to a positively polarized alignment layer 54. Over time, the ionized impurities 52 and 53 adhere to the alignment layers. Therefore, the liquid crystal molecules 55 retain their own direct current voltage, i.e., R-DC voltage, due to the ionized impurities 52 and 53 adhering to the alignment layers 51 and 54, respectively. Accordingly, the R-DC voltage in the liquid crystal cell is a major factor causing the image-sticking defect along with the electrical characteristics of the alignment layer. Since the R-DC voltage changes a pretilt angle and alignment of the liquid crystal molecules in the liquid crystal cell, the liquid crystal molecules are not susceptible to the applied signal. Therefore, the image sticking defect occurs when displaying another image after continuously displaying the same image for a long period of time.

The alignment layer is formed of a polymer compound, such as polyimide, and is disposed adjacent to the liquid crystal layer. The alignment layer is formed by a rubbing process to orient the liquid crystal molecules in one direction. The alignment of the liquid crystal molecules is variable in accordance with the alignment layer. Furthermore, the response of liquid crystal molecules to the applied electric field is variable in accordance with the alignment layer. Since the alignment layer is electrically susceptible to rubbing conditions, the alignment layer can trap electrical charges. Accordingly, any trapper charges may decrease control of the alignment of the liquid crystal molecules, thereby contributing to the image-sticking defect.

Two causes for the formation of the image-sticking defect, the R-DC voltage and the electrical characteristics of alignment layer, may not be readily recognizable. Namely, the two above-described causes for creating the image-sticking defect are related to each other. Furthermore, other factors may cause the image-sticking defect in the TFT-LCD since the LCD device includes many other elements and may be fabricated by different processes.

One method for measuring the image-sticking defect includes observation by the naked eye. However, the naked eye observation has an observational error of ±2%, and thus it is very difficult to confirm whether or not the image-sticking defect exists. Additionally, observation by the naked eye cannot accurately provide a degree with which the image-sticking defect occurs. Alternatively, there are other methods for measuring the image-sticking defect that use characteristics of the LCD elements. Specifically, the image-sticking defect existence and degree are measured by way of observing the elements of the liquid crystal display that may affect the image-sticking defect. However, among the different methods for measuring the image-sticking defect, the method of measuring R-DC voltage is widely known. The image-sticking defect caused by the electrical characteristics of the alignment layer cannot be effectively measured. Additionally, the method of measuring the variable factors causing the image-sticking defect is not sufficiently developed.

Currently, a method for measuring the R-DC voltage and a voltage holding ratio (VHR) measurement method are known. When a liquid crystal display panel exhibits a R-DC voltage, both the image-sticking defect and flickering occur in the liquid crystal display panel. In order to control and prevent the flicker phenomenon, a voltage opposite in polarity to the "off-set" voltage is applied to the liquid crystal cell. In the R-DC voltage measurement method, the "off-set" voltage that is applied to the liquid crystal cell by the thin film transistor is measured. According to the voltage holding ratio (VHR) measurement method, a discharged direct current voltage is measured. A voltage stored in the liquid crystal cell is discharged by the resistance of liquid crystal layer when the TFT is turned on, thereby causing the R-DC voltage. Then, the alternating current voltage applied to the liquid crystal cell and the charged voltage remaining at the liquid crystal cell are measured. From the result of these measurements and the voltage holding ratio, the discharged direct current voltage is theoretically calculated.

In FIGS. 5 and 6, the R-DC voltage measurement method and the VHR measurement method are compared to each other. FIG. 5 is a graph showing relative maximum values of a R-DC voltage according to the R-DC voltage measurement method, and FIG. 6 is a graph showing relative maximum values of a R-DC voltage according to the VHR measurement method. In these graphs, the roman numeral I represents a polyimide alignment layer, and roman numeral II to VI represent alignment layers respectively fabricated by different fabrication processes. In order to measure the R-DC voltage, the direct current voltage is successively applied to the liquid crystal cells having the different kinds of alignment layers in a direction from negative to positive (L.R-DC), and then applied in a direction from positive to negative (T.R-DC).

The R-DC voltage and VHR measurement methods are widely used in measuring the image-sticking defect. However, these measurement methods do not consider any intrinsic characteristics of LCD elements. Therefore, although the liquid crystal cells have the same alignment layer when performing the above-described measurement methods, the results are different depending on each of the measurement cases.

Accordingly, the above-described methods using the R-DC voltage is not an adequate measurement method when testing for the existence and degree of the image-sticking defect. Specifically, the existence of the image-sticking defect cannot be clearly known, and the image-sticking defect degree cannot be accurately measured.

SUMMARY OF THE INVENTION

Accordingly, the present invention is directed to a method for measuring an image sticking defect in a liquid crystal display panel that substantially obviates one or more of problems due to limitations and disadvantages of the related art.

An object of the present invention is to provide a method for measuring an image-sticking defect of a liquid crystal display device.

Another object of the present invention is to provide a method for quantifying an image-sticking defect of a liquid crystal display device.

Another object of the present invention is to provide a method for generating a gray scale of a liquid crystal display device.

Another object of the present invention is to provide a method for measuring a luminance change ratio of a liquid crystal display device.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for measuring image sticking in the liquid crystal display device includes steps of irradiating light from a backlight to the liquid crystal display device, displaying a first full white state on a liquid crystal display screen of the liquid crystal display device to which the light is irradiated, measuring first luminance values of a plurality of designated points on the liquid crystal display screen, calculating an average luminance value of the first full white state using the first luminance values, displaying a full black state on the liquid crystal display screen, measuring second luminance values of the plurality of designated points on the liquid crystal display screen, calculating an average luminance value of the full black state using the second luminance values, forming a gray scale using the average luminance value of the first full white state and the average luminance value of the full black state, displaying a second full white state on the liquid crystal display screen, and measuring a luminance change of the second full white state with time at the plurality of designated points using the gray scale.

In another aspect, a method for quantifying an image-sticking defect of a liquid crystal display device includes steps of displaying a first full white state on a liquid crystal display screen of the liquid crystal display device via a backlight source, calculating an average luminance value of the first full white state using luminance measurement values of a plurality of designated points on the liquid crystal display screen, measuring a first luminance value of the backlight source, displaying a full black state on the liquid crystal display screen, calculating an average luminance value of the full black state using luminance measurement values of the plurality of designated points on the liquid crystal display screen, measuring a second luminance of the backlight source, generating a gray scale with the average luminance values of the first full white and full black states, the gray scale having 64 levels, displaying a second full white state on the liquid crystal display screen, measuring a brightest luminance value and a darkest luminance value, calculating a luminance change ratio using the brightest luminance value and the darkest luminance value, calculating a transmission ratio using the average luminance value of the first full white state and the first luminance value of the backlight source, and quantifying the image-sticking defect using the luminance change ratio and the transmission ratio.

In another aspect, a method for generating a gray scale of a liquid crystal display device includes steps of displaying a full white state on a liquid crystal display screen of the liquid crystal display device, calculating an average luminance value of the full white state using luminance measurement values of a plurality of designated points on the liquid crystal display screen, displaying a full black state on the liquid crystal display screen, calculating an average luminance value of the full black state using luminance measurement values of the plurality of designated points on the liquid crystal display screen, and generating a gray scale with the average luminance values of the full white and black states.

In another aspect, a method for measuring a luminance change ratio of a liquid crystal display device includes steps of displaying a first full white state on a liquid crystal display screen of the liquid crystal display device, calculating an average luminance value of the full white state, displaying a full black state on the liquid crystal display screen, calculating an average luminance value of the full black state, generating a gray scale with the average luminance values of the full white and black states, displaying a second full white state on the liquid crystal display screen, measuring brightest and darkest luminance values, and calculating the luminance change ratio using the brightest and darkest luminance values.

It is to be understood that both the foregoing general description and the following detailed description are exemplary and explanatory and are intended to provide further explanations of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are shown in the accompanying drawings. Wherever possible, the same reference numbers will be used throughout the drawings to refer to the same or like parts.

The present invention uses a luminance of a liquid crystal display (LCD) for measuring an existence and a degree of an image sticking defect. The luminance of the LCD is the degree of brightness generally described using units of nit, $Cd/m^2$ etc.

Transmission is one of many relationships between the luminance of a LCD and the luminance of a backlight light source. The transmission can be expressed as a ratio of the LCD luminance to the backlight luminance in percentage as follows.

$$\text{Transmission Ratio}(\%) = \frac{\text{luminance of LCD}}{\text{luminance of backlight}} \times 100\%$$

Figure 1:
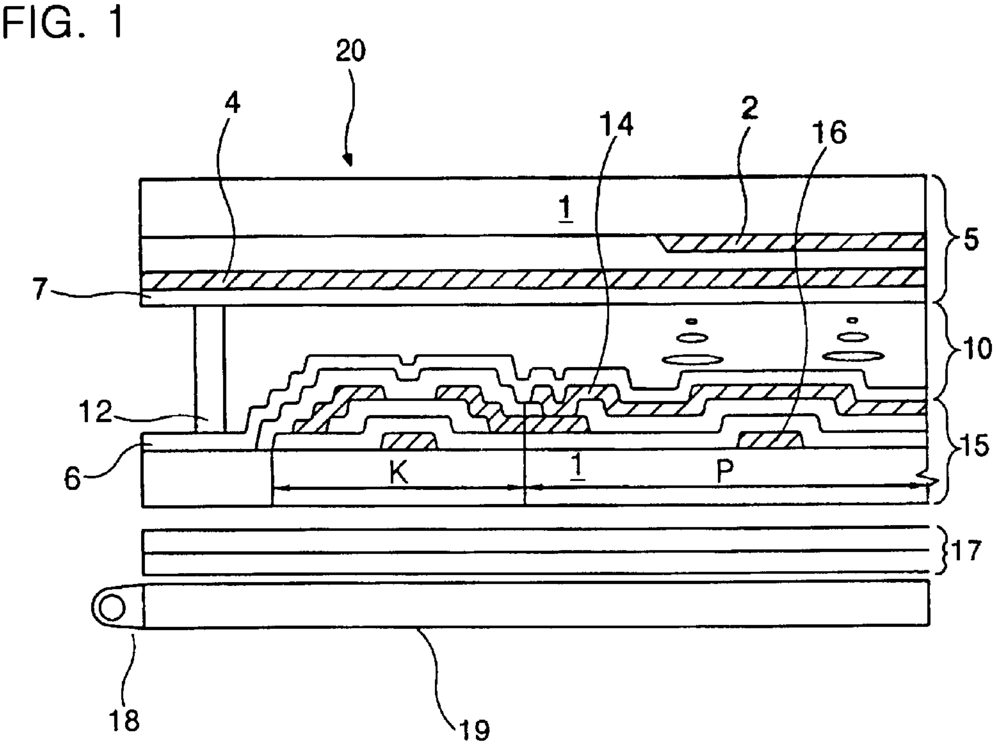
FIG. 1 is a cross-sectional view of a conventional LCD panel in an active matrix LCD.
Figure 2:
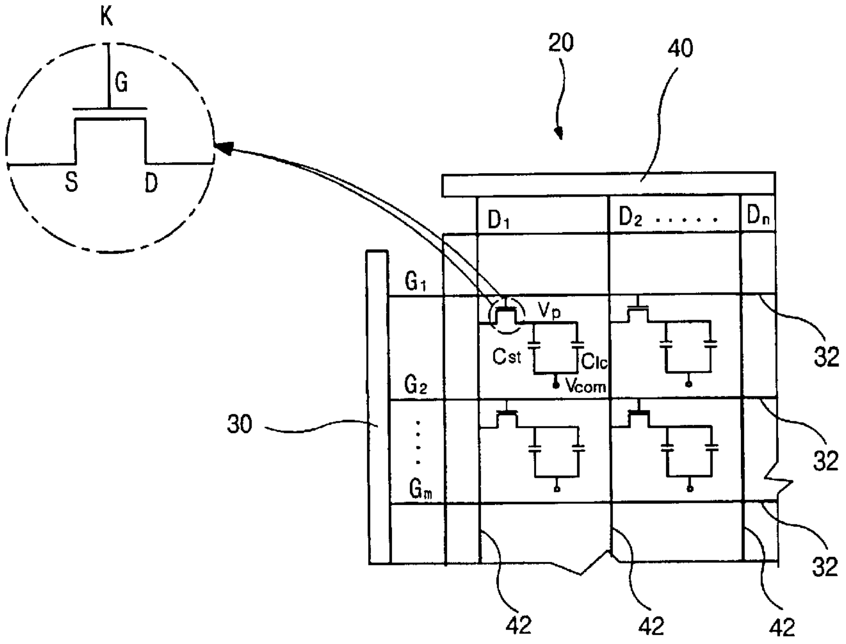
FIG.2 (RELATED ART)
FIG. 2 is a circuit diagram of a conventional active matrix liquid crystal display panel.
Figure 3:
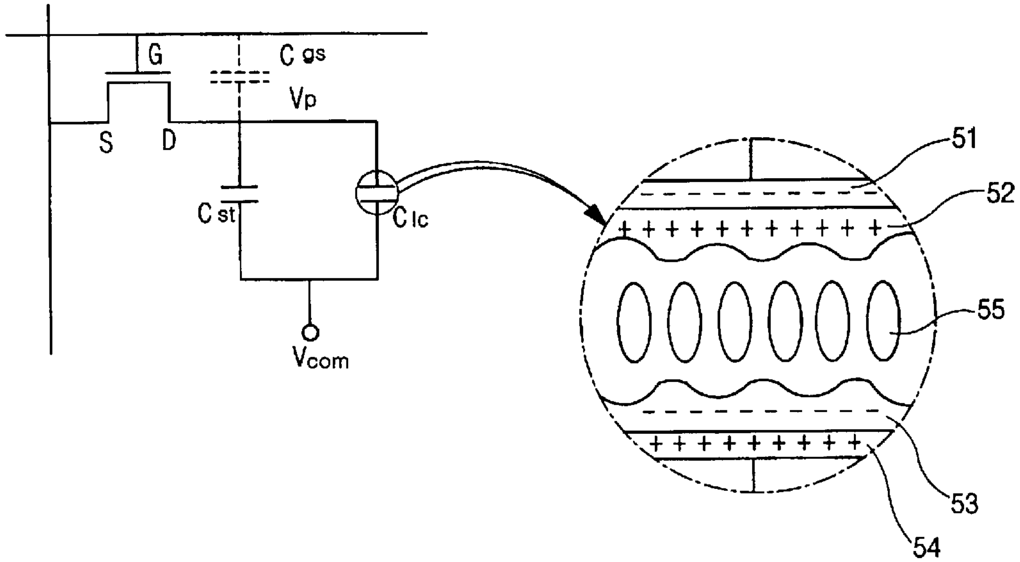
FIG.3 (RELATED ART)
FIG. 3 is a partial circuit diagram of a conventional liquid crystal display panel.
Figure 4A:
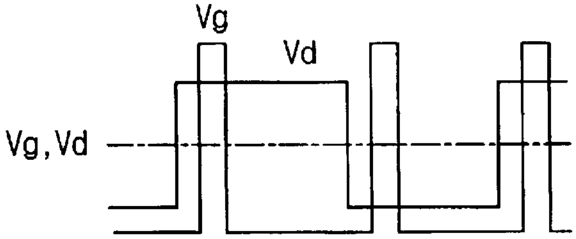
FIG.4A (RELATED ART)
FIG. 4A is a plot showing conventional voltages applied to a thin film transistor of the liquid crystal panel.
Figure 4B:
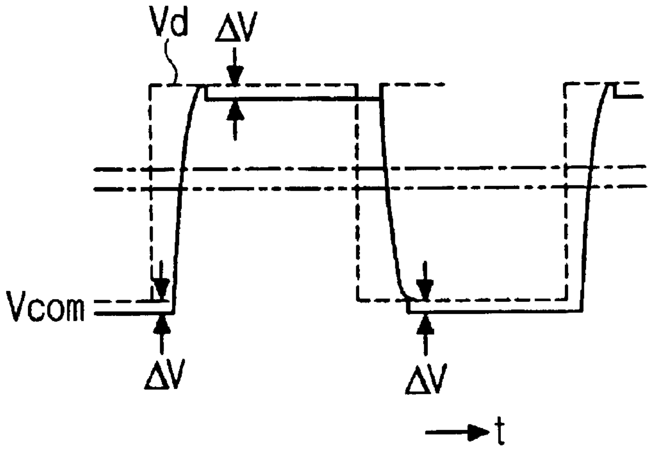
FIG.4B (RELATED ART)
FIG. 4B is a plot showing conventional voltages applied to a liquid crystal cell via a thin film transistor.
Figure 5:
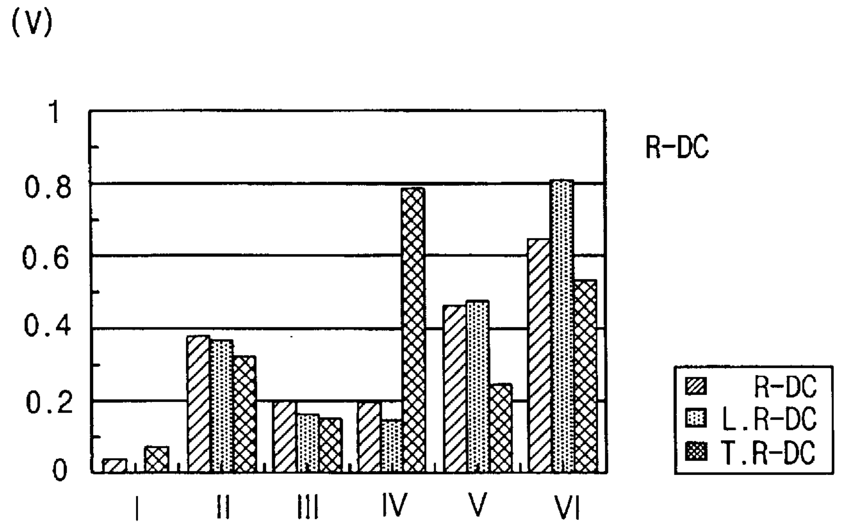
FIG.5 (RELATED ART)
FIG. 5 is a graph showing relative maximum values of a residual direct current (R-DC) voltage according to a conventional R-DC voltage measurement method.
Figure 6:
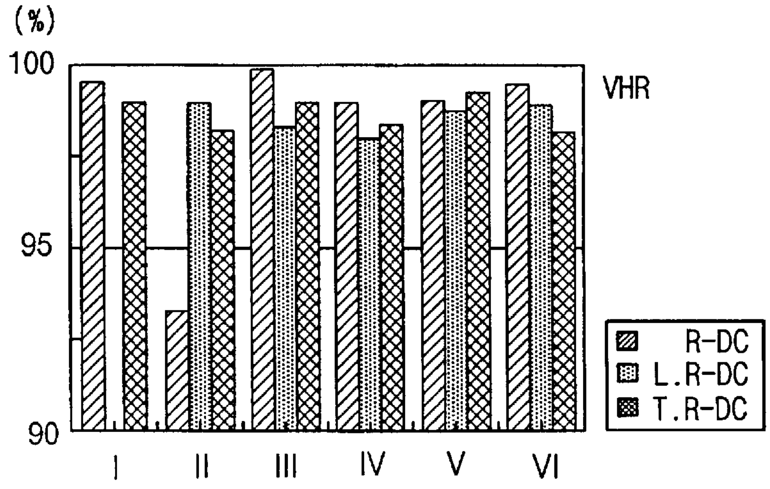
FIG.6 (RELATED ART)
FIG. 6 is a graph showing relative maximum values of a residual direct current (R-DC) voltage according to a conventional VHR measurement method.
Figure 7:
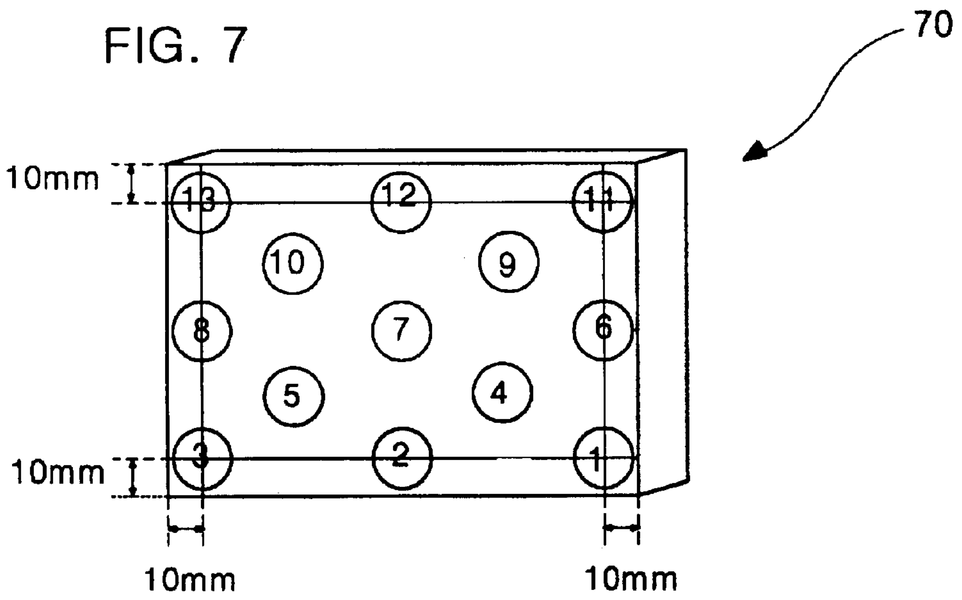
FIG. 7 is a front view showing 13 designated points on an exemplary liquid crystal display(LCD) screen according to the present invention.

The light irradiated from the backlight source is affected by a depth distribution of the liquid crystal cell, transmission distribution of each element and a depth distribution of a color filter. Accordingly, the luminance varies with respect to the position on the screen even though an image with same brightness is displayed on the LCD screen. Therefore, an average value of the luminances measured at 13 points is calculated and characterized as the luminance of LCD screen. In FIG. 7, 13 points including the edge (10 mm width), which is to be covered when the LCD module is completed, are designated on the LCD screen 70.

The relative brightness of the LCD screen can be varied from a full white state to a full black state by adjustment of a voltage magnitude or a voltage pulse width. The gray scale has 64 levels by defining the full white state, i.e., the brightest state on LCD screen, as gray 63 of the gray scale and the full black state, i.e., the darkest state on LCD screen, as gray 0 of the gray scale. The remaining portions of the gray scale is dividing into 62 levels from gray scale 1 to gray scale 62.The present invention provides a method for measuring the existence of an image-sticking defect through the change of luminance displayed on an LCD screen using the gray scale.

Figure 8:
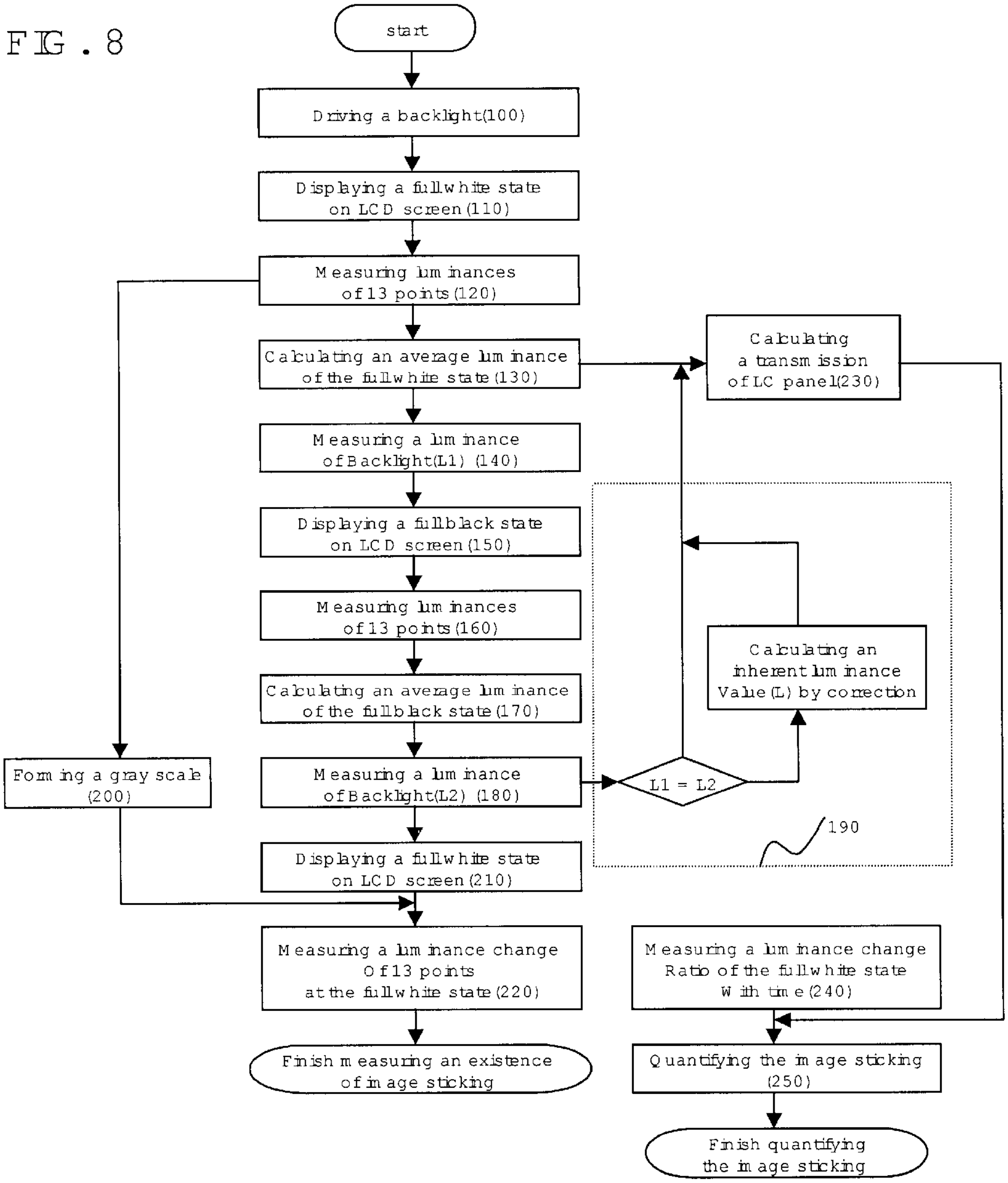
FIG. 8 is a flow chart showing an exemplary method for measuring and quantifying an image-sticking defect according to the present invention.

FIG. 8 shows a flow chart showing an exemplary method for measuring and quantifying an image-sticking defect according to the present invention. In FIG. 8, during step 100, the back light irradiates the LC panel. Thereafter, in step 110, a full white state may be displayed on the irradiated LCD screen and held in that state for a specific period of time. By keeping the full white state for a specific period of time, the luminance stabilizes, thereby improving the reliance of the gray scale. The specific period of time is at least 30 minutes, and more desirably, 2 hours, for example.

In step 120, luminance of the designated points on the LCD screen displaying the full white state may be measured.

In step 130, an average luminance of the designated points may be calculated.

In step 140, luminance of the backlight L1 may be measured.

In step 150, the full black state may be displayed on the irradiated LCD screen and held in that state for 2 hours, for example.

In step 160, luminance of the designated points on the LCD screen displaying the full black state may be measured.

In step 170, an average luminance of the designated points may be calculated.

In step 180, the luminance of the backlight L2 may be measured again.

In step 190, an inherent luminance value L may be calculated to include a correction process if the measurement of the backlight L2 luminance is not same with the measurement of the backlight L1 luminance. The correction process improves the reliance of the gray scale. Accordingly, if the backlight L1 luminance (luminance of the backlight at full white state) is higher or lower than backlight L2 luminance (luminance of the back light at full black state), then the backlight L1 luminance may be decreased or increased to match the backlight L2 luminance.

In step 200, a gray scale may be established to include 64 levels constructed to define an average luminance value, wherein the full white state calculated above as gray scale 63 and the full black state calculated above as gray scale 0. The remaining portions of the gray scale may be divided into 62 levels from gray scale 1 to gray scale 62.

In step 210, after maintaining the full black state for specific amount of time, the full white state is displayed again by application of a voltage magnitude and voltage pulse width equivalent to the voltage magnitude and voltage pulse width for generating the previous full white state.

In step 220, the change of luminance of the plurality of designated points is measured with time at the second full white state.

An exemplary method for measuring a luminance change ratio at the full white state will be explained as follow. Initially, a change of luminance of the designated points at the fall white state is continuously measured using the previously established gray scale having 64 levels. A luminance value is obtained when the average luminance value of the designated points demonstrate a change equivalent to a two-level difference in gray scale. If the luminance value is measured when the average luminance value of the designated points is equivalent to a one-level difference in gray scale, the measurement process will be too complicated. If the luminance value is measured when the average luminance value of the designated points is equivalent to a three-level difference in gray scale, an accurate luminance value will be difficult to obtain. Accordingly, a two-level difference basis increases efficiency of the measurement.

Since the luminance change of the full white state is caused by the residual image of the previous full black state, the ratio of change of luminance is proportional to the image-sticking defect. Therefore the occurrence of the image-sticking defect can be determined by the luminance change ratio of the full white state. Accordingly, the larger the luminance change ratio, the larger the degree of the image-sticking defect. The luminance of the full white state becomes stable in two hours after the full white state is redisplayed. At this time, the full black state can be redisplayed and the luminance change ratio of the full black state can be measured, thereby increasing reliance of the image-sticking defect measurement.

Next, an explanation of an exemplary method for quantify the image-sticking defect will be described. As previously described, the transmission ratio may be expressed as:

$$\text{Transmission Ratio}(\%) = \frac{\text{luminance of LCD}}{\text{luminance of backlight}} \times 100\%$$

The luminance change ratio of the LCD at the full white state can be obtained by the ratio of the brightest luminance value ($Max_{white}$) and the darkest luminance value ($Min_{white}$) among the plurality of designated points measured when the average luminance value of the designated points demonstrate a change equivalent to a two-level difference in the gray scale. In step 240, the numerical expression may be:

$$\text{luminance change ratio}(\delta_{white}) = \frac{Max_{white}}{Min_{white}} \times 100\%$$

A quantified value of image sticking (expressed as "y" here) in an LCD can be expressed numerically using the transmission ratio and luminance change ratio previously obtained.

$$y = \left(\frac{\text{luminance of LCD}}{\text{luminance of backlight}} - \frac{Max_{white}}{Min_{white}}\right) \times 100\%$$

Because the value "y" calculated above is obtained by subtracting the luminance change ratio ($\delta_{white}$) from the transmission ratio, the change of "y" and the degree of the image-sticking defect are proportional. Therefore, if the value "y" does not change with time, no image-sticking defect exists. Conversely, if the value "y" changes greatly, a significant degree of image-sticking defect exists.

Figure 9:
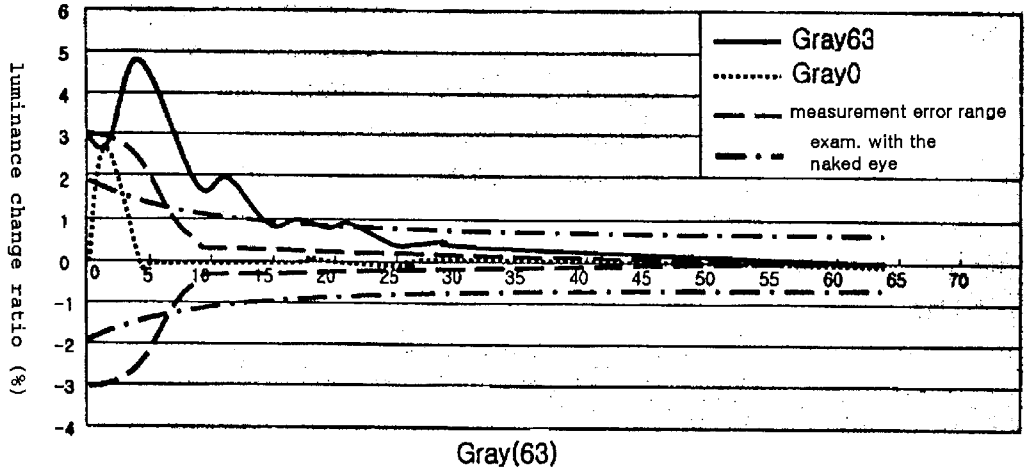
FIG. 9 is a exemplary graph illustrating results of an image sticking defect measurement obtained by the method according to the present invention.
Figure 10:
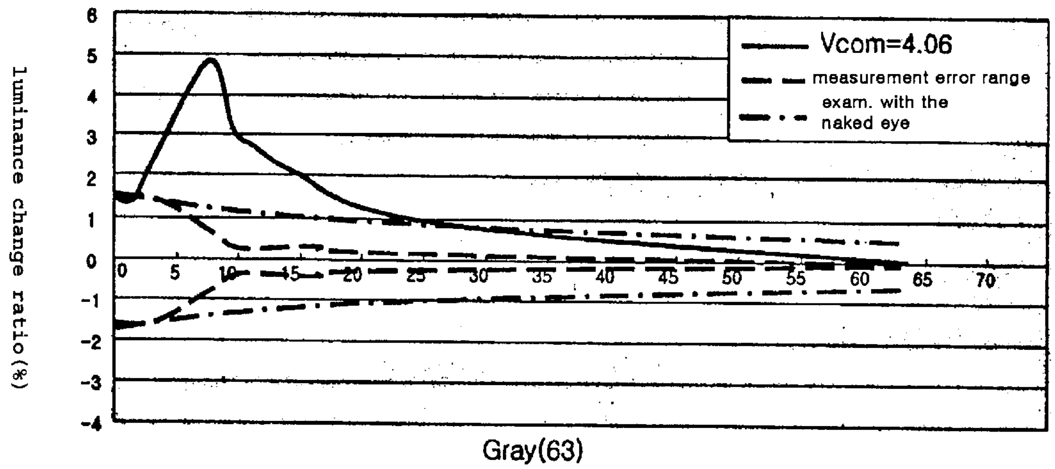
FIG. 10 is a exemplary graph illustrating results of an images ticking defect measurement obtained by the method according to the present invention.

FIGS. 9 and 10 illustrate results of an image-sticking defect in an LCD measured using the exemplary method according to the present invention. FIG. 9 illustrates results for a LCD using a backlight of a notebook computer. The bold type solid line illustrates the luminance change ratio measured from the time immediately after the full white state is displayed on the screen. The bold type dotted line illustrates the luminance change ratio of the full black state measured in the same way as above after keeping the full white state for two hours for stabilization.

FIG. 10 illustrates results for a LCD using a backlight for a computer monitor. The bold type solid line illustrates the luminance change ratio of the full white state measured in the same way as above when the voltage of 4.06 volts is applied to LCD. The luminances of the full white states displayed on the screen in FIG. 9 and FIG. 10 are equivalent to 67 $Cd/m^2$ and 95.3 $Cd/m^2$, respectively. In FIGS. 9 to 10, the exemplary method for image-sticking defect measurement according to this invention yields more accurate measurement results than examination with the naked eye.

It will be apparent to those skilled in the art that various modifications and variations can be made in the method for measuring the image-sticking defect of the present invention without departing from the spirit or scope of the invention. Thus, it is intended that the present invention cover the modifications and variations of this invention provided they come within the scope of the appended claims and their equivalents.

What is claimed is:

1. A method for measuring an image-sticking defect in a liquid crystal display device, comprising:

irradiating light from a backlight to the liquid crystal display device;

displaying a first full white state on a liquid crystal display screen of the liquid crystal display device to which the light is irradiated;

measuring first luminance values of a plurality of designated points on the liquid crystal display screen;

calculating an average luminance value of the first full white state using the first luminance values;

displaying a full black state on the liquid crystal display screen;

measuring second luminance values of the plurality of designated points on the liquid crystal display screen;

calculating an average luminance value of the fall black state using the second luminance values;

forming a gray scale using the average luminance value of the first full white state and the average luminance value of the full black state;

displaying a second full white state on the liquid crystal display screen; and measuring a luminance change of the second full white state with time at the plurality of designated points using the gray scale.

2. The method according to claim 1, wherein a number of the plurality of designated points is 13.

3. The method according to claim 1, further comprising:

measuring a luminance value of the backlight while displaying the first full white state on the liquid crystal display;

measuring a luminance value of the backlight while displaying the full black state on the liquid crystal display; and obtaining an inherent luminance value of the backlight.

4. The method according to claim 3, wherein the step of obtaining an inherent luminance value of the backlight includes comparing the luminance value of the backlight of the first full white state to the luminance value of the backlight of the full black state.

5. The method according to claim 4, further comprising:

calculating a transmission percentage ratio of the average luminance value of the first full white state to the inherent luminance value of the backlight.

6. The method of claim 5, further comprising:

obtaining a luminance change percentage ratio by calculating a ratio of a brightest luminance value to a darkest luminance value of the second full white state at the plurality of designated points; and measuring the image-sticking defect using a difference between the transmission and the luminance change percentrage ratio.

7. The method according to claim 1, wherein a voltage applied to the liquid crystal display device during the step of displaying a first full white state is equal to a voltage applied to the liquid crystal display device during the step of displaying a second full white state.

8. A method for quantifying an image-sticking defect of a liquid crystal display device, comprising:

displaying a first full white state on a liquid crystal display screen of the liquid crystal display device via a backlight source;

calculating an average luminance value of the first full white state using luminance measurement values of a plurality of designated points on the liquid crystal display screen;

measuring a first luminance value of the backlight source;

displaying a full black state on the liquid crystal display screen;

calculating an average luminance value of the full black state using luminance measurement values of the plurality of designated points on the liquid crystal display screen;

measuring a second luminance of the backlight source;

generating a gray scale with the average luminance values of the first full white and full black states, the gray scale having 64 levels;

displaying a second full white state on the liquid crystal display screen;

measuring a brightest luminance value and a darkest luminance value;

calculating a luminance change ratio using the brightest luminance value and the darkest luminance value;

calculating a transmission ratio using the average luminance value of the first full white state and the first luminance value of the backlight source; and quantifying the image-sticking defect using the luminance change ratio and the transmission ratio.

9. The method according to claim 8, wherein the step of displaying a first full white state occurs for a first time period of at least about 30 minutes.

10. The method according to claim 9, wherein the first time period is approximately 2 hours.

11. The method according to claim 8, wherein a number of the plurality of designated points is 13.

12. The method according to claim 8, wherein the step of displaying a full black state occurs for a second time period of about two hours.

13. The method according to claim 8, wherein the luminance change ratio is calculated using the following expression:

$$\delta_{white} = \frac{\text{Min}_{white}}{\text{Max}_{white}} \times 100\%$$

where $\delta_{white}$ is the luminance change ratio, $\text{Max}_{white}$ is the brightest luminance value, and $\text{Min}_{white}$ is the darkest luminance value.

14. The method according to claim 8, wherein the transmission ratio is calculated using the follow equation:

$$\text{Transmission Ratio}(\%) = \frac{\text{luminance of LCD}}{\text{luminance of backlight}} \times 100\%.$$

15. A method for generating a gray scale of a liquid crystal display device, comprising:

displaying a full white state on a liquid crystal display screen of the liquid crystal display device;

calculating an average luminance value of the full white state using luminance measurement values of a plurality of designated points on the liquid crystal display screen;

displaying a full black state on the liquid crystal display screen;

calculating an average luminance value of the full black state using luminance measurement values of the plurality of designated points on the liquid crystal display screen; and generating a gray scale with the average luminance values of the full white and black states.

16. The method according to claim 15, wherein the gray scale includes 64 levels.

17. The method according to claim 16, wherein a 0-level of the gray scale corresponds to the full black state and a 63rd-level corresponds to the full white state.

18. A method for measuring a luminance change ratio of a liquid crystal display device, comprising:

displaying a first full white state on a liquid crystal display screen of the liquid crystal display device;

calculating an average luminance value of the full white state;

displaying a full black state on the liquid crystal display screen;

calculating an average luminance value of the full black state;

generating a gray scale with the average luminance values of the full white and black states;

displaying a second full white state on the liquid crystal display screen;

measuring brightest and darkest luminance values; and calculating the luminance change ratio using the brightest and darkest luminance values.

* * * * *